US011619570B1

(12) United States Patent
Eninger et al.

(10) Patent No.: US 11,619,570 B1
(45) Date of Patent: Apr. 4, 2023

(54) FILTER-BASED AIR SAMPLER CAPABLE OF INTEGRATION INTO SMALL UNMANNED AERIAL VEHICLES

(71) Applicant: Government of the United States, as represented by the Secretary of the Air Force, Wright-Patterson AFB, OH (US)

(72) Inventors: Robert Eninger, Oakwood, OH (US); Stephanie Ohms, Beavercreek, OH (US); Jeremy Slagley, Bellbrook, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 102 days.

(21) Appl. No.: 17/202,434

(22) Filed: Mar. 16, 2021

Related U.S. Application Data

(60) Provisional application No. 63/033,384, filed on Jun. 2, 2020.

(51) Int. Cl.
   *G01N 1/22* (2006.01)
   *B64C 39/02* (2006.01)
   (Continued)

(52) U.S. Cl.
   CPC ....... *G01N 1/2273* (2013.01); *B01D 46/0005* (2013.01); *B01D 46/0049* (2013.01); *B01D 46/16* (2013.01); *B64C 39/024* (2013.01); *G01N 1/2205* (2013.01); *G01N 1/24* (2013.01); *B01D 2273/30* (2013.01); *B01D 2279/40* (2013.01); *B64C 2201/027* (2013.01);
   (Continued)

(58) Field of Classification Search
   CPC ...... G01N 7/10; G01N 33/0011; G01N 1/405; G01N 33/0047; G01N 2001/4016
   USPC .......................................... 73/31.07
   See application file for complete search history.

(56) References Cited

U.S. PATENT DOCUMENTS

| 9,513,635 B1 * | 12/2016 | Bethke | G01C 21/20 |
| 11,079,366 B2 * | 8/2021 | Klein | G01M 3/22 |

(Continued)

FOREIGN PATENT DOCUMENTS

| CA | 2881204 A1 | 8/2016 |
| CA | 2881204 A1 * | 8/2016 |

(Continued)

OTHER PUBLICATIONS

SKC Limited, "I.O.M. Multi-Dust Samplers Operating Instructions", www.skcltd.com website, Nov. 2019, 007-05-003 Issue F, published by SKC Limited, Dorset, United Kingdom.

*Primary Examiner* — Clayton E. LaBalle
*Assistant Examiner* — Kevin C Butler
(74) *Attorney, Agent, or Firm* — AFMCLO/JAZ; Jeffrey V. Bamber

(57) ABSTRACT

A filter-based air sampler, more specifically a filter-based air sampler capable of integration into small unmanned aerial systems is disclosed. The filter-based air sampler may include a filter assembly which has as its component parts: an open faced air intake component, a filter, and a filter support that has a central supporting grid. The filter assembly may joined to the housing of a fan, such as a centrifugal fan, with the supporting grid of the filter support being disposed over the air inlet of the fan.

11 Claims, 5 Drawing Sheets

Figure 1:
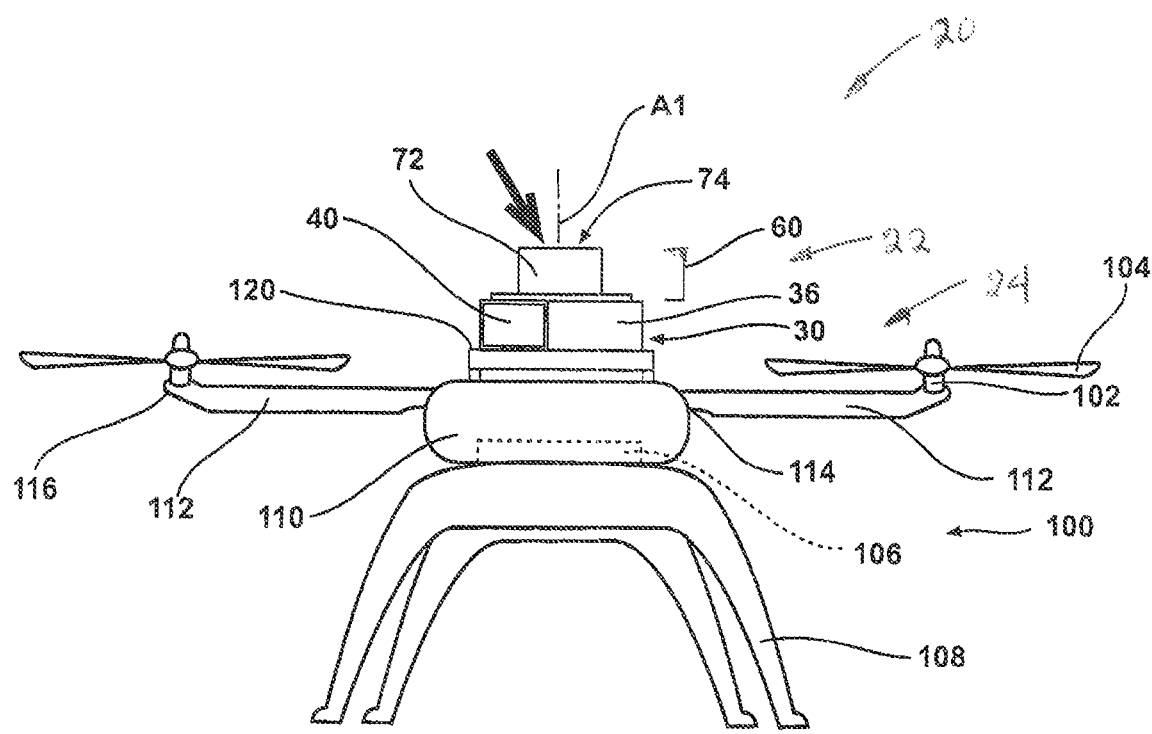

(51) Int. Cl.
*G01N 1/24* (2006.01)
*B01D 46/00* (2022.01)
*B01D 46/16* (2006.01)

(52) U.S. Cl.
CPC .. *B64C 2201/042* (2013.01); *B64C 2201/108* (2013.01); *B64C 2201/12* (2013.01); *G01N 2001/245* (2013.01)

(56) References Cited

U.S. PATENT DOCUMENTS

| | | | | |
|---|---|---|---|---|
| 11,172,339 | B1 * | 11/2021 | Hummer | G08B 21/12 |
| 11,220,335 | B1 * | 1/2022 | Felder | B64C 39/022 |
| 2016/0368604 | A1 * | 12/2016 | Duesterhoft | B64D 1/16 |
| 2017/0369168 | A1 * | 12/2017 | Hwang | A61L 9/14 |
| 2020/0033157 | A1 * | 1/2020 | Kaufman | B64D 1/02 |

FOREIGN PATENT DOCUMENTS

| | | | | | |
|---|---|---|---|---|---|
| CN | 106153403 | A | | 11/2016 | |
| CN | 106153403 | A | * | 11/2016 | G01N 1/2273 |
| CN | 106769241 | A | * | 5/2017 | G01D 21/02 |
| CN | 106769241 | A | | 5/2017 | |
| CN | 106769254 | A | * | 5/2017 | |
| CN | 106769254 | A | | 5/2017 | |
| CN | 106932235 | A | * | 7/2017 | G01N 1/2273 |
| CN | 106932235 | A | | 7/2017 | |
| CN | 107422747 | A | * | 12/2017 | |
| CN | 107422747 | A | | 12/2017 | |
| CN | 108146628 | A | * | 6/2018 | B64C 27/08 |
| CN | 108146628 | A | | 6/2018 | |
| CN | 108528718 | A | * | 9/2018 | |
| CN | 108528718 | A | | 9/2018 | |
| CN | 108871882 | A | | 11/2018 | |
| CN | 108871882 | A | * | 11/2018 | |
| CN | 110208468 | A | * | 9/2019 | |
| CN | 110208468 | A | | 9/2019 | |
| CN | 209387621 | U | | 9/2019 | |
| CN | 209387621 | U | * | 9/2019 | G01N 33/0032 |
| CN | 110308023 | A | | 10/2019 | |
| CN | 110308023 | A | * | 10/2019 | |
| EP | 3599166 | A1 | * | 1/2020 | B64C 27/08 |
| JP | 4474275 | B2 | | 6/2010 | |
| WO | WO-2018148636 | A1 | * | 8/2018 | B64C 27/12 |
| WO | WO-2021262420 | A1 | * | 12/2021 | B64C 39/024 |

* cited by examiner

FILTER-BASED AIR SAMPLER CAPABLE OF INTEGRATION INTO SMALL UNMANNED AERIAL VEHICLES

RIGHTS OF THE GOVERNMENT

The invention described herein may be manufactured and used by or for the Government of the United States for all governmental purposes without the payment of any royalty.

Pursuant to 37 C.F.R. § 1.78(a)(4), this application claims the benefit of and priority to prior filed Provisional Application Ser. No. 63/033,384, filed Jun. 2, 2020, which is expressly incorporated herein by reference.

FIELD OF THE INVENTION

The present invention relates generally to a filter-based air sampler and, more particularly, to a filter-based air sampler capable of integration into small unmanned aerial vehicles.

BACKGROUND OF THE INVENTION

Unmanned Aircraft Systems (UAS) and Unmanned Aerial Vehicles (UAVs) have been used since their inception for support of military endeavors. Small Unmanned Aerial Systems (SUAS) technology presents many environmental sampling advantages. These range from removing danger to humans during the sampling task, to improving amount and types of data that can be collected. Many of the prior SUAS sampling platforms were based on fixed-wing aircraft which are useful for long-range operations. However, in order to gather a representative sample of a specific, smaller area, a multirotor aircraft is more suitable. Though limited by lower endurance, multi-rotors may be suitable for Chemical, Biological, Radiological, and Nuclear (CBRN) agent operations because of their ability to rapidly and safely sample hazardous areas.

Though each of the CBRN agents come with their own sampling and detection challenges, biologicals (and bioaerosols particularly) carry with them multiple challenges when being sampled from a multi-rotor platform. One of the foremost challenges using this platform is the presence of rotor-wash from the multi-rotor itself impacting the flow of particles around the vehicle. Bioaerosols also hold the challenge of determining whether viable aerosols can or should be collected. There are many factors involved in sampling, including sample time, sample media, and environment where the sample is taken that can influence the viability of a biological sample. Finally, bioaerosols do not have a standard collection methodology or exposure limits and can be difficult to quantify outside of laboratory methods like quantitative Polymerase Chain Reactions (qPCR) or dilution plating.

A need exists for improved sampling devices and methods for safely sampling airborne particles, including but not limited to bioaerosols. In particular, a need exists for improved sampling devices that: (1) safely detect the presence of airborne particles, such as bioaerosols in a specific area; (2) are suitable for use on a multi-rotor UAV by virtue of being sturdy, small in size, lightweight, and having low power requirements for operation; (3) are capable of surviving washing with soap and water to decontaminate the device; and (4) are sufficiently inexpensive that portions thereof may be disposable after use.

SUMMARY OF THE INVENTION

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a filter-based air sampler is provided. The term "filter-based", as used herein, means that the air sampler utilizes a filter. The filter-based air sampler comprises a filter assembly that is joined to a fan, such as a centrifugal fan.

The filter assembly may comprise a stand-alone invention in its own right independent from the fan. The filter assembly may comprise: a filter support comprising a supporting grid and an open faced air intake component which may have a central retaining grid associated therewith. A space is provided in the filter assembly for a filter to be positioned between the retaining grid and the supporting grid of the filter support.

The centrifugal fan comprises a housing having an air inlet and an air outlet, a drive shaft, and an impeller having blades that are mounted around a hub which is configured for revolving around the drive shaft. The fan may have a motor associated therewith that joined to the drive shaft. The motor is electrically connectable to a power supply. In this embodiment, to form the filter-based air sampler, the filter assembly is joined to the housing of the centrifugal fan with the supporting grid of the filter support being disposed over the air inlet of the centrifugal fan.

In another embodiment, an aerial sampling system is provided. The aerial sampling system comprises an unmanned aerial vehicle (UAV) and the filter-based air sampler is joined to the unmanned aerial vehicle. The unmanned aerial vehicle may be of a rotary type, and may comprise a single rotor or a multi-rotor platform.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 1 is a side elevation view of a filter-based air sampler joined to a small unmanned aerial vehicle.

FIG. 2 is perspective view of the components of the filter assembly.

FIG. 3 is a plan view of a centrifugal fan when viewed from the surface containing the air inlet.

FIG. 4A is a schematic perspective view of a centrifugal fan showing the air flow through the centrifugal fan.

FIG. 4B is a schematic plan view showing one configuration of the fan blades for a centrifugal fan.

FIG. 5 is an exploded perspective view showing the assembly of the components of the sampling device.

FIG. 6 is a perspective view of the assembled sampling device.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention relates generally to a filter-based air sampler and, more particularly, to a filter-based air sampler capable of integration into small unmanned aerial vehicles.

Figure 4A:
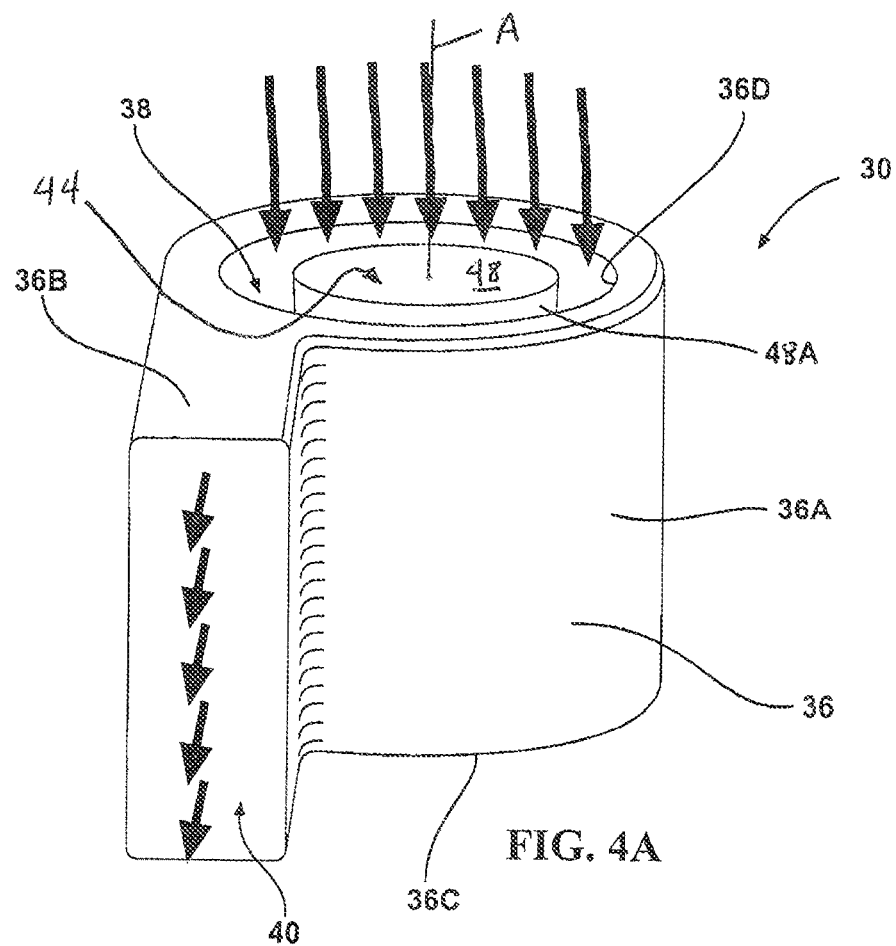
Figure 4B:
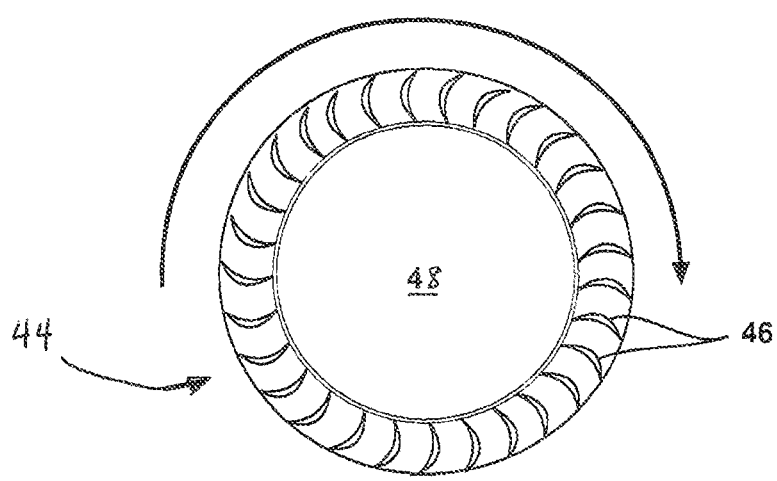

The air sampler described herein can be used to sample airborne particles of any type and size that are capable being collected on the filters described herein. These particles may include, but are not limited to: atmospheric particulate pollutants (such as PM2.5), certain chemical particulates, biological, radiological, and nuclear particulate matter. Biological particulate matter includes bioaerosols.

"Bioaerosols" specifically refer to living (viable) and non-living (non-viable) microorganisms or their byproducts that are suspended in the air. Living bioaerosols include bacteria, viruses, fungal spores, pollen, and algae, among others. Non-viable forms include endotoxins and proteins, among others. Some viable bioaerosols retain their viability for long periods of time in adverse conditions. These include bacterial spores, fungal spores, mold spores, and other spores, as well as certain viruses that are hardy.

The air sampler can be used to collect particles of various sizes, depending on the air flow and the filter selected. In some cases, the size of particles that may be collected may fall within a range from greater than or equal to about 0.001, 0.01, or 0.1 micron up to about 30 microns, or more in size (if spherical, in diameter). The size of the particles collected can fall within any narrower range that lies within the above range. For example, if it is desired to collect bacteria particles, almost all bacteria and their spores are under 12 microns in diameter, in which case the sampler can be designed to collect particles that range in size from about 0.1 micron up to about 12 microns. In one embodiment in which bioaerosols spores are of interest, the sampler can be designed to collect particles that are about 0.5 to about 1 micron in size. If particles of a particular size are intended to be collected, it may be desirable to collect greater than or equal to about 90%, 95%, or 100% of the particles of the desired size from the entire volume of air that is drawn into the sampler while the sampler is running. This volume of air may be referred to as the "sampled environment".

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

FIG. 1 shows one non-limiting embodiment of an aerial sampling system 20 comprising a filter-based air sampling device 22 that is joined to an unmanned aerial vehicle (UAV) 24 to form an atmospheric particle collection device.

The term "joined", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined" includes both those configurations in which an element is temporarily joined to another element, or in which an element is permanently joined to another element. The phrase "integration into", as used herein, has the same meaning as "joined to".

The filter-based air sampling device (or "sampler" or "sampling device") 22 comprises a fan (or "blower" or "sampling pump") 30 and a filter assembly 60 that is joined to the fan 30. In the embodiment shown in the drawings, the fan 30 is a centrifugal fan. The fan 30 may be electrically connectable to a power supply.

The centrifugal fan 30 may also be referred to as a "squirrel cage" fan. As shown in FIGS. 3 and 4A, the centrifugal fan 30 comprises a housing 36 having an air inlet 38 and an air outlet 40, a drive shaft, and an impeller 44 having blades 46 that are mounted around a hub 48, and a motor joined to the drive shaft. Some of these components are inside the housing and are not visible in the drawings. These components of the centrifugal fan 30 are conventional (and, thus, need not all be shown). The impeller (or "fan wheel") 44 has an axis A and is rotatably joined to the drive shaft so that it is configured for being rotated about its axis A by the drive shaft.

FIG. 4A shows that the housing 36 has a portion with a drum-shaped configuration with convex curved or generally cylindrical side walls 36A that have a first end portion and a second end portion. The housing 36 further comprises substantially planar first and second end walls 36B and 36C which are joined substantially perpendicularly to the curved side walls 36A adjacent to the first and second end portions, respectively, of the curved side walls 36A. The substantially planar first and second end walls 36B and 36C may be referred to as the top and bottom walls when the fan is in the orientation shown in FIG. 4A when the axis A of the impeller 44 is in a vertical orientation with the first end wall 36B facing upward. When the aforementioned walls are described as side, top, and bottom walls, this is done for convenience only, and is not intended to be limiting since it is understood that the fan may be rotated in a different orientation with a different side of the fan housing being oriented vertically upward. As shown by arrows in FIG. 4A, air enters the air inlet 38 of the centrifugal fan 30 and is discharged at the outlet 40 in a direction that is at an approximately 90 degree angle relative to the direction the air was moving into the inlet 38.

In the embodiment shown in FIG. 4A, the first end wall 36B of the fan housing 36 has an annular (or circular ring-shaped) air inlet opening 38 therein. The annular air inlet opening 38 is defined at an outermost portion by a circular opening portion 36D in the housing and an inside portion defined by the circular end portion 48A of the hub 48 of the impeller 44. In this case, the air comes into the fan around the outside of the impeller hub 48.

In other embodiments, the centrifugal fan may have a cylindrical inlet having an axis that is aligned with the axis A of the impeller 44. This cylindrical inlet forms a circular inlet opening where the air comes into the air inlet inside the impeller 44 and its blades 46. The air sampler can utilize centrifugal fans having either of these inlet opening configurations.

Centrifugal fans can have blades 46 that are forward curved, backward curved, or radial. Forward curved blades are those in which the fan blades curve in the direction of the fan wheel rotation. Backward curved blades are those in which the fan blades curve against the direction of the fan wheel rotation. While any of the above blade configurations can be used, in some cases as shown in FIG. 4B, it may be desirable for the fan blades 46 to be forward curved. The arrow in FIG. 4B shows the direction of fan wheel rotation. It should be understood that FIG. 4B is provided for purposes of illustrating forward curved fan blades, and that FIG. 4B does not depict the rotation of the fan wheel in FIG. 4A, since the fan wheel in FIG. 4A will be rotating in a counter-clockwise direction.

In the embodiment shown, the centrifugal fan 30 has its own motor contained within its housing 36 and is not visible in the drawings. In other embodiments, the centrifugal fan 30 may not be provided with a motor within its housing, and a separate motor that is operatively connected to the drive shaft of the fan may be used. In either case, the motor may be a conventional electric brushless motor.

Figure 3:
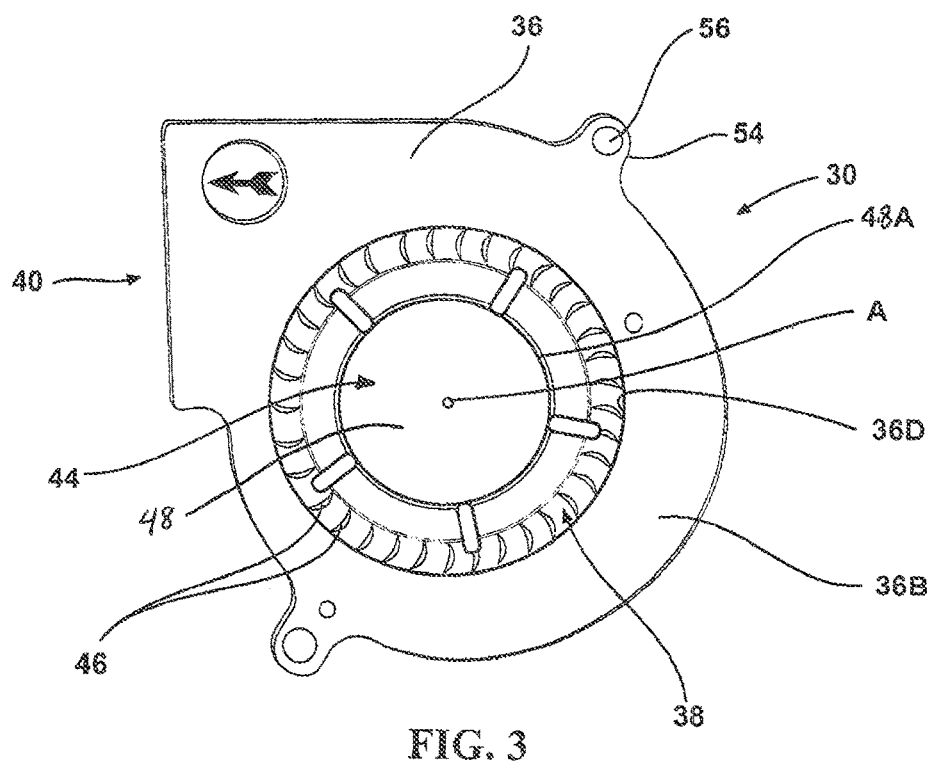

In the embodiment shown in FIG. 3, the housing 36 of the centrifugal fan 30 has two extensions 54 on the sides of the housing that provide openings 56 for bolts 58 to pass through. Certain commercially available centrifugal fans may be used, provided that they are capable of drawing particles into the filter, and are small, lightweight, and have a low power draw. One suitable device for use as the centrifugal fan is a 12V DC fan/blower model number HT-07530D12 supplied by Fugetek of Houston, Tex., U.S.A. and available through amazon.com. In such a case, the centrifugal fan can be of a type that is used for cooling a computer.

The power drawn by the sampling device (and specifically by the fan motor) should be relatively low. In some cases, it may be desirable for the power draw for the sampling device 22 to be less than or equal to about 0.5, 0.4, 0.3, 0.2, or 0.1 amps. The power supply for the fan 30 can comprise any power source suitable for powering the centrifugal fan 30 when the unmanned aerial sampling system is in flight collecting an air sample. The power supply may be the same as the power supply (or a portion thereof, such as one of several batteries) used to power the UAV; or an additional power supply may be provided. If the UAV power source is being used to power both the UAV and the fan, it is desirable for the bulk of the power drawn be devoted to generating lift for the UAV. In addition, it may be desirable for a portion of the UAV power supply to also be available to power other components such as GPS, a modem, or a camera. If the fan 30 does not utilize the UAV's power supply, any suitable type of additional power supply may be used. For example, a separate 4S, 5S, or 6S lithium polymer (LiPo) battery can be used to power the fan 30.

Figure 5:
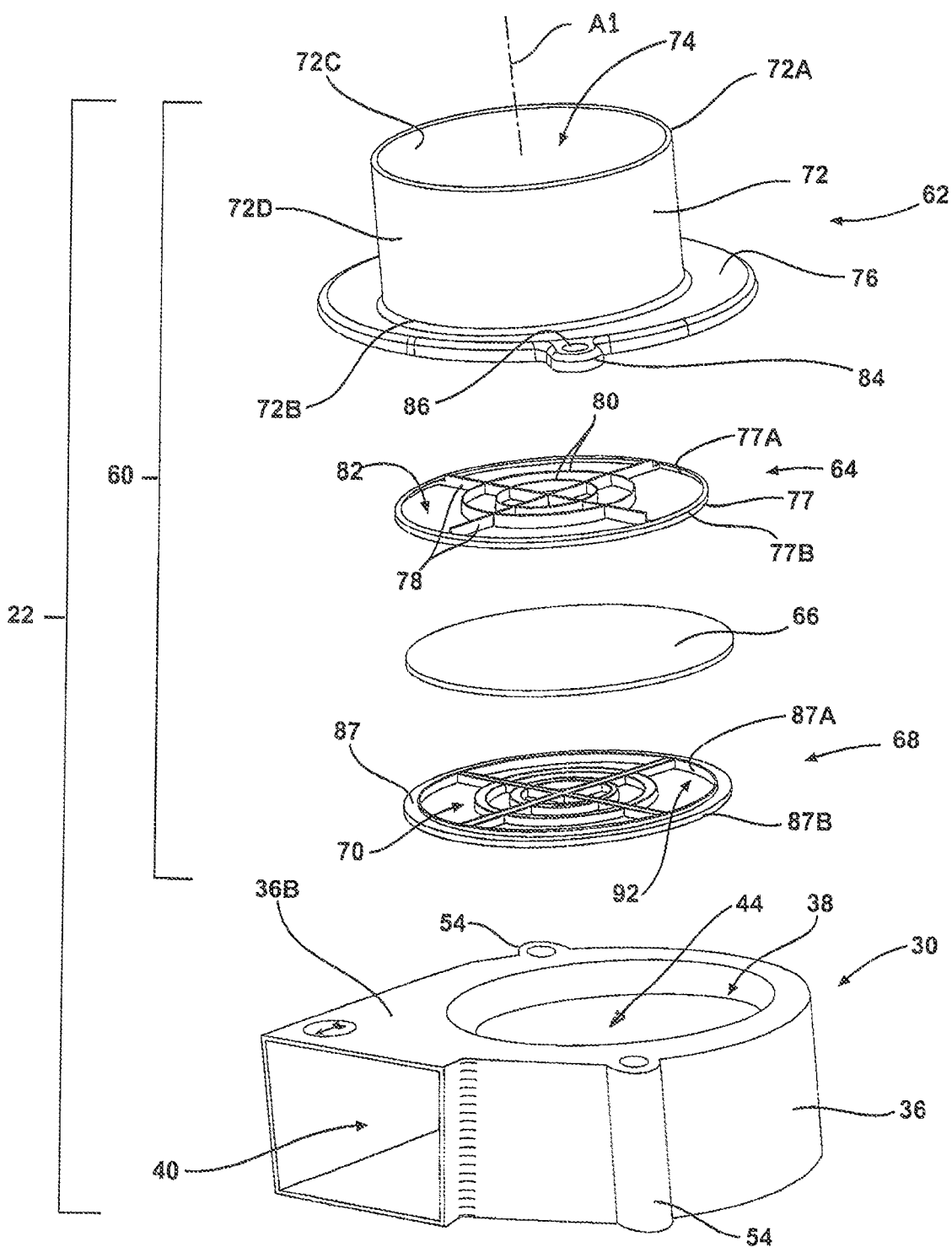

FIG. 5 shows that the filter assembly 60 comprises: an open faced air intake cassette (or "air intake component") 62 which may be associated with a central retaining grid 64; a filter 66; and a filter support 68 comprising a supporting grid 70. The term "filter assembly" includes the components set forth above. The term "sampling device assembly" may be used to refer to the components of the filter assembly without the filter being present. The phrase "associated with", as used herein, means that one component can comprise part of another component, or one component may be used with and/or fit together with the other component. An example of the former is that the retaining member 64 may comprise part of the air intake component 62. An example of the latter is that the retaining member 64 may fit together with the air intake component 62. When in use, the filter 66 is positioned between the retaining member 64 associated with the air intake component 62 and the supporting grid 70 of the filter support 68.

The open faced air intake component or cassette 62 is provided in the configuration described herein. It should be understood that the term "cassette" is intended to be that which is used in the air sampling field, rather than that used in the recording field (in which a cassette is a sealed plastic unit containing a length of audiotape, videotape, or film wound on a pair of spools). The open faced air intake component 62 comprises: a tubular portion 72 having an axis A1, a first end (or "inlet end") 72A, a second end 72B, an inside surface 72C, and an outside surface 72D. The inlet end 72A defines an air intake 74.

A base (or "flange") 76 is joined to the outside surface 72D of the tubular portion 72 adjacent the second end 72B of the tubular portion. The flange 76 can have any suitable configuration. In some embodiments, the flange 76 may have a circular periphery. In the embodiment shown in the drawings, the flange 76 may have a configuration that is similar to the shape of the surface 36B of the fan housing 36 to which the flange 76 will be joined. The flange 76 extends outwardly from the tubular portion 72 substantially perpendicularly to the axis A1 of the tubular portion 72. The arrangement of these portions of the air intake component 62 can be alternatively thought of as one in which the tubular portion 72 extends perpendicularly from a relatively central portion of the flange 76 (which tubular portion 72 will extend outward in a direction opposite the fan 30).

The retaining member 64 is positioned adjacent to the inside surface of the tubular portion 72 of the air intake component 62. The retaining member 64 may be located at approximately the same place along the axis A1 of the tubular portion 72 as the flange 76. In some embodiments, the retaining member 64 may be joined to the inside surface of the tubular portion 72 and comprise part of the air intake component 62. Alternatively, the retaining member 64 may a separate component that may be positioned inside the tubular portion 72 of the air intake component, and held in place by elements such as tabs or a shelf inside the tubular portion 72. The retaining member 64 comprises an open retaining grid (that is, a grid having openings therein). The retaining member 64 is provided to hold the filter 66 in place to allow for various orientations of the unmanned aerial vehicle (UAV) in flight and is useful if the pump 30 is not turned on until mid-flight. For example, if the air intake 74 is facing downward and no air is being pulled through the sampler 22, the retaining member 64 will be able to keep the filter 66 from falling out of the sampler 22 due to gravity.

Figure 2:
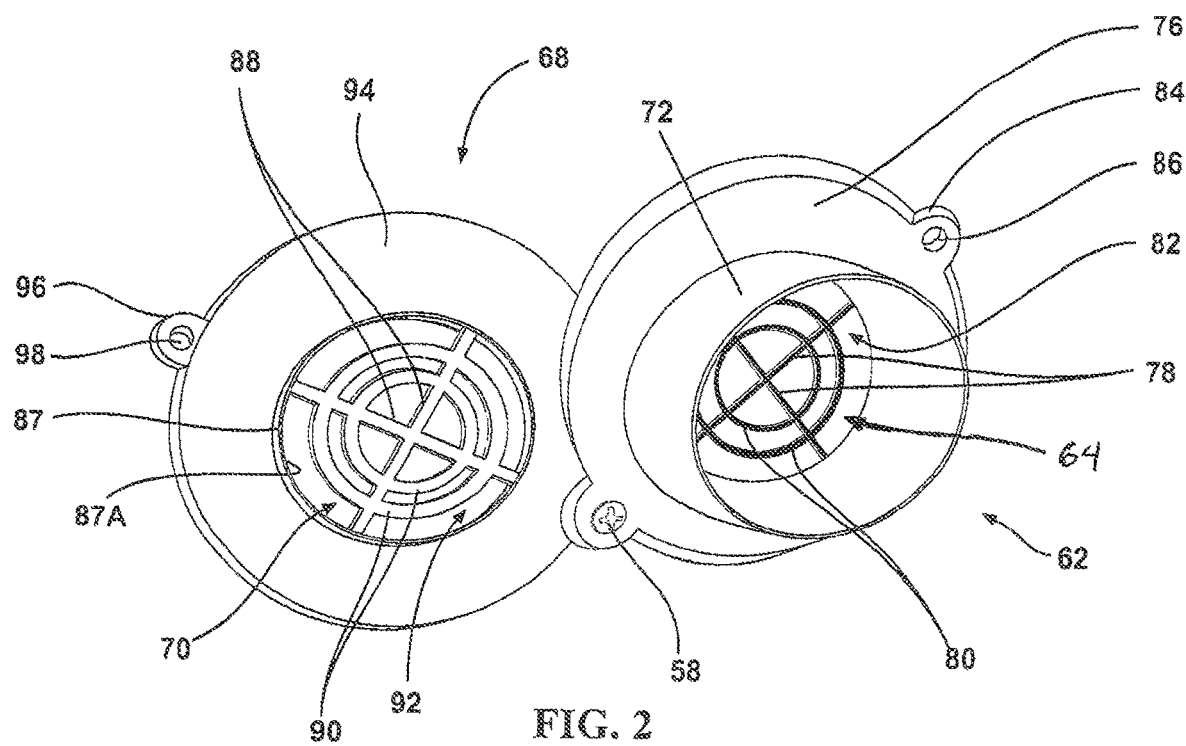

The retaining member 64 in the embodiment shown in FIGS. 2 and 5 comprises: a perimeter portion 77 (which may be ring-shaped) having an inner surface 77A and an outer surface 77B; a pair of members 78 in the form of a cross that are joined to the inner surface 77A of the perimeter portion; and a pair of concentric rings 80 that are joined to the members 78 in the form of a cross. The elements 78 and 80 define at least one retaining grid opening (and typically a plurality of openings) 82 therebetween. The retaining grid openings 82 may be in any suitable configuration. In the embodiment shown, the retaining grid openings 82 have an annular configuration so that they provide an air flow path directly into the filter 66 (and through the filter 66 to the inlet opening 38 of the fan 30). The inside of the tubular portion 72 of the air intake component 62 is free of any obstructions from the air intake opening 74 to the filter 66 (with the exception of the retaining grid 64) to allow the free flow of air and particles from the air intake opening 74 to the filter 66.

The open faced air intake component 62 can be provided with additional optional features. For example, as shown in FIG. 2, the flange 76 may have two extensions 84 from the sides that provide openings 86 for bolts to pass through for joining the components of the air sampler together.

The open faced air intake component 62 can have any suitable dimensions. The inlet opening 74, for example, can be greater than or equal to 350, 400, 450, 500, 550, 600 mm$^2$, etc. . . . up to 2,000 mm$^2$, or more. The total open area of the openings 82 in the retaining grid 64 can also be greater than or equal to the above amounts. In one embodiment, the air intake component 62 may have a 47 mm diameter inlet opening 74 and a 75 mm diameter circular base 76 for attaching the air intake component 62 to the fan 30. The height of the air intake component 62 in such an embodiment may be about 25 mm.

The filter support 68 comprises an open supporting grid. The filter support 68 in the embodiments shown in FIGS. 2 and 5 comprises: a perimeter portion 87 (which may be ring-shaped) having an inner surface 87A and an outer surface 87B; a pair of members 88 (reference numbers in FIG. 2) in the form of a cross that are joined to the inner surface 87A of the perimeter portion; and a pair of concentric rings 90 that are joined to the members 88 in the form of a cross. These elements 88 and 90 define at least one retaining grid opening (and typically a plurality of openings) 92 therebetween. The supporting grid may have the same or similar configuration as the retaining grid 64, and thus also provide openings 92 having an annular configuration. In some cases, the elements defining the supporting grid 70 (that is, the elements that form the cross and the concentric circles) may be slightly wider than those of the retaining grid 64. As shown in FIG. 2, the filter support 68 may also comprise a flange 94 that is joined to the perimeter portion 87 outside of the supporting grid 70. The flange 94 of the filter support 68 may also have two optional extensions 96 from the sides that provide openings 98 for bolts 58 to pass through.

It may be desirable for the air sampler 22 to be relatively small in size. In some embodiments, the air sampler 22 may have overall dimensions such that the volume occupied by the air sampler is less than or equal to about 0.125 ft$^3$ (about 3,500 cm$^3$). A non-limiting example of suitable dimensions for the air sampler 22 may be about 0.5×0.5×0.5 ft. (or about 15×15×15 cm).

It may also be desirable for the air sampler 22 to have a relatively low weight. The air sampler 22 may, in some cases, weigh less than or equal to about 150, 140, 130, 120, 100, 90, 80, 75 grams, or less. The filter assembly 60 may, in some cases, weigh less than or equal to about 100, 90, 80, 75, 70, 60, 50, 40 grams, or less. In one case, the weight of the filter assembly 60 may be about 60 g (about 0.13 lbs.). In such a case, when the filter assembly 60 is combined with the centrifugal fan 30, the overall weight of the air sampler 22 may be about 112.0 g (about 0.25 lbs.). The weights of the filter assembly 60 and the air sampler 22 may also fall within any range between any two of the numbers specified above for such components.

The open faced air intake component 62, the retaining member 64, and the filter support 68 can be made in any suitable manner for making lightweight plastic parts (or parts of other lightweight materials). Suitable methods for making the air intake component 62, retaining member 64, and the filter support 68 include, but are not limited to molding, casting, and 3D printing. In some cases, it may be desirable for the components of the filter assembly 60 to be inexpensive and disposable, particularly if they have been contaminated.

The filter 66 can be any suitable type of filter for collecting the particles of interest. Suitable types of filters may include, but are not limited to: glass fiber, quartz, cellulose nitrate, mixtures of cellulose acetate and cellulose nitrate, polycarbonate, polytetrafluoroethylene (PTFE), and gelatin filters. In one embodiment for detecting bioaerosols, a 5 micron cellulose nitrate filter may be used. The filter may be circular having a diameter and is substantially flat (or planar) and relatively thin. Such filters are often very thin, having a thickness of less than or equal to the following: about 1 mm, 0.9 mm, 0.8 mm, 0.7 mm, 0.6 mm, 0.5 mm, 0.4 mm, 0.3 mm, 0.2 mm, or 0.1 mm. The filter 66 may have any suitable diameter, with diameters in a range of from about 37 mm to about 70 mm being desirable. For the embodiment described above, the filter may have a diameter of about 47 mm. Suitable filters are available from SKC Inc., Eighty Four, Pa., U.S.A.

Figure 6:
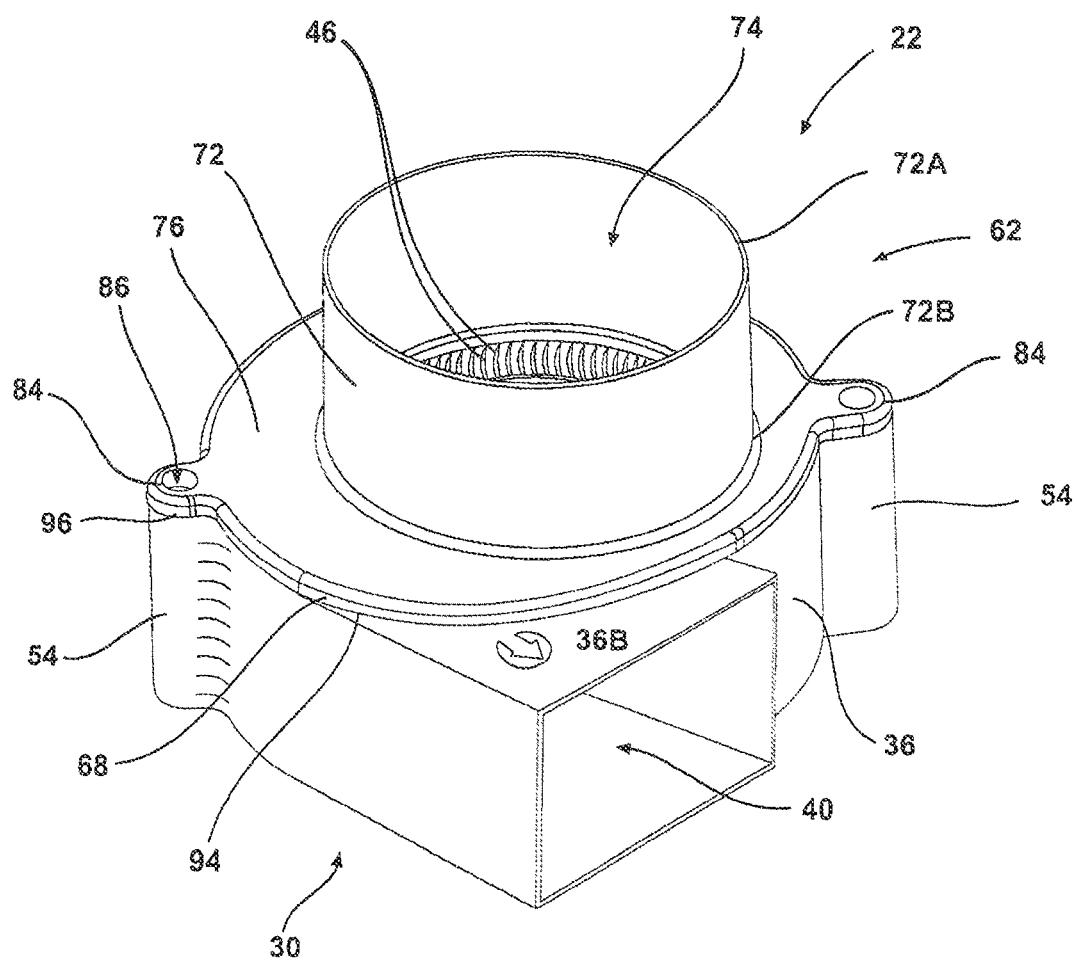

The filter 66 sits on top of the filter support 68 and under the retaining member 64 that is associated with the intake component 62. It is desirable for the components filter assembly 60 to be held closely together so that there is an airtight seal between the filter assembly 60 and the centrifugal fan 30. It may, thus, be desirable for there to be minimal spacing between the base of the filter assembly 60 and the air inlet 38 of fan 30. For instance, the space between the base of the filter assembly 60 and the inlet of fan may be less than about 0.25, 0.2, 0.1, inches, or there may be no space therebetween. The base of the filter assembly 60 may, in some cases, be the base 76 of the air intake component 62. In other cases as shown in FIG. 6, when the filter support 68 comprises a flange 94, the flange 94 of the filter support 68 may form the base of the filter assembly 60.

The components of the sampling device 22 can be held together in any suitable manner. Suitable ways of holding the components of the sampling device 22 together include, but are not limited to: threaded connections, friction fit, and bolts. In the embodiment shown in the drawings, the air intake component 62, the filter support 68, and the fan 30 are bolted together with bolts 58 which are fastened with nuts. In addition, there may be gaskets between any of the components, or plumber's putty may be used to keep the connections between the components air tight.

The air flow rate through the filter 66 may be any suitable rate that permits particles of the desired size to be drawn onto the filter yet is not so high that the air flow rate results in filter tears, fan burnout, or different aerosol particle sizes being favored over the target particle sizes. In some cases, an air flow rate in a range from about 0.8 liters per minute (LPM) to about 1.2 LPM may be desirable with an air flow rate of about 1 LPM being one example of a suitable air flow rate. The pressure drop through the filter should be as low as possible. In some cases, it may be desirable for the pressure drop to be less than or equal to about 310 Pa.

The unmanned aerial vehicle ("UAV" or "drone") 24 may comprise any suitable type of device that is capable of flying and carrying the air sampling device 22 in order to gather a sample from a specific area of the air above the ground without the need for a person to enter the area being sampled. UAVs may be a component of an unmanned aircraft/aerial system (UAS) which include a UAV, a ground-based controller, and a system of communications between the UAV and the controller.

The unmanned aerial vehicle 24 may be sufficiently small and light weight that it can be launched and operated by less than 4, 3, or 2 people, and is transportable by a High Mobility Multipurpose Wheeled Vehicle (HMMWV). In some cases, it may be desirable for the unmanned aerial vehicle 24 to be less than or equal to about 6, 5, 4, 3, or 2 feet in diameter measured from rotor to rotor. In some cases, it may be desirable for the unmanned aerial vehicle 24 to weigh less than or equal to about 50, 40, 30, 20, 10, or 5 lbs. In some cases, it may be desirable for the unmanned aerial system to be capable of flying for 15, 20, 25, 30, or more minutes.

The unmanned aerial vehicle 24 is of a rotary type, and may comprise a single rotor or a multi-rotor platform. In the embodiment shown in FIG. 1, the unmanned aerial system 24 comprises an air frame (or "frame") 100, electric motors 102, propellers (rotors) 104, a power supply such as a battery 106, landing gear 108, an electronic speed controller (ESC), a flight control/board, and a radio transmitter. One or more of these components, such as landing gear 108, may be optional. The multi-rotor platform can be of any suitable type including, but not limited to quadcopters, hex-rotor, and octo-rotor frame devices.

The air frame 100 typically comprises a central housing portion 110 and a plurality of arms (or booms) 112 extending radially outwardly from the central housing portion 110 from their proximal ends 114 to their distal ends 116. The motor(s) 102 are mounted on the frame adjacent to the distal ends of the arms, and the propellers 104 are mounted on the shaft of each of the motors. Although only two rotors are shown in FIG. 1 for simplicity of illustration, any suitable number of arms and rotors may be provided. The power supply may be said to be located "on-board" the air frame 100. The term "on-board" includes locations that are inside or outside of the specified component, such as the air frame 100. The battery 106, the ESC, and the remote control receiver are typically provided in the central housing portion 110.

The unmanned aerial vehicle 24 may be capable of waypoint navigation. The unmanned aerial vehicle 24 may be capable of transmitting telemetry to a ground control station. The ground control station may be capable of receiving telemetry from the unmanned aerial vehicle 24. The unmanned aerial vehicle 24 may be modular and capable of safe retrieval of the sample without adding contamination to the sample.

It is possible to join the sampling device 22 to many different parts of the unmanned aerial vehicle 24. For instance, the sampling device 22 may be joined to the top of the central housing portion 110, the bottom of the central housing portion 110, the arms 112, etc. However, it may be desirable to join the sampling device 22 on top of the central housing portion 110 of the unmanned aerial vehicle 24 for yielding the most accurate results. It is also possible for the sampling device to be joined to the unmanned aerial system 24 in many different orientations. For example, the sampling device 22 can be oriented with the opening 74 of the air intake component 62 facing upward, downward, forward in the direction of flight, etc. However, it has been found that orienting the sampling device 22 with the inlet 38 of the centrifugal fan 30 and the opening 74 of the air intake component 62 vertically upward may be desirable for yielding the most accurate results.

The sampling device 22 may be joined to the unmanned aerial vehicle 24 in any suitable manner. In one embodiment such as shown in FIG. 1, the sampling device 22 may be mounted on (that is, joined to) a platform or breadboard 120 that is joined to the UAV 24. In this embodiment, the sampling device 22 and breadboard 120 can be joined together with bolts and also joined to the UAV 24 with bolts. In other embodiments, the sampling device 22 can be joined to the UAV 24 using industrial strength VELCRO® fastening material. Flexibility of mounting may be desirable if a user wishes to vary the payload to include other components on the UAV (for example, GPS, etc.). In such a case, a breadboard 120 can be provided which has space to hold the sampling device 22 as well as additional components.

The total weight of the aerial sampling system 20 should be low enough so that the aerial sampling system 20 can be launched and operated by a few number of people as described above, and so that the UAV can fly for a sufficient time to collect the sample. In one non-limiting embodiment, the total weight of the aerial sampling system 20 may be about 2,940 g (about 6.5 lbs.), which includes 112.0 g (about 0.25 lbs.) for the sampling device 22 and 1,200 g (about 2.6 lbs.) for the UAV 24, as well as various additional optional components that are added to the UAV along with the sampling device 22.

It may also be desirable for safety, and other purposes, for the sound level of the entire aerial sampling system 20 to be relatively low, such as less than or equal to about 60 dBA measured at a distance of three feet from the sampling system 20.

To use the aerial sampling system 20, a filter 66 is placed positioned between the retaining member 64 of the air intake component 62 and the supporting grid 70 of the filter support 68. The components of the air sampler are joined together to enclose the filter 66 therebetween and to join the same to the centrifugal fan 30. The air sampler is then joined to the unmanned aerial vehicle 24, unless one or more components such as the fan 30 and filter support 68 are already joined thereto. The aerial sampling system 20 is then flown into the area or areas in which it is desired to take sample. The fan motor may be turned on when the UAV 24 is launched. Alternatively, the fan motor can be provided with an electronic switch so that it can be turned on remotely when it is desired to start collecting samples after the UAV 24 is launched. The aerial sampling system 20 is flown in the area(s) with the fan 30 running for the desired amount of time for sample collection.

The sample(s) may be collected at any desired height, or range of heights (that is, altitudes). Examples of suitable ranges of heights for sample collection range from just above ground level up to 400 feet, or more. Four hundred feet is the maximum allowable altitude for UAV's permitted by the U.S. Federal Aviation Administration (FAA). In some cases, such as emergency response situations where the air may present a danger to humans, it may be desirable to collect the sample at a height of about 20 feet above ground level. This will also be more likely to allow the operator of the system to maintain line-of-sight with the UAV at all times during operation.

After the sample is collected, the unmanned aerial vehicle 24 is returned to an elevation where it can be retrieved by the operator, by another person, or by some other mechanism. The filter 66 may be removed, and the remaining parts of the filter assembly 60 may be disposed of The UAV 24 can then be decontaminated by washing with soap and water rinse. Alternatively, the intake opening 74 of the air intake component 62 can be covered with a water impervious covering, and the aerial sampling system 20 may be decontaminated. After removal, the filter 66 may be placed in a sealed container. The filter 66 containing the sample may then be taken to a laboratory for analysis by methods such as quantitative Polymerase Chain Reactions (qPCR) or dilution plating.

The aerial sampling system 20 can be provided with numerous other optional components that are joined to the UAV 24 and serve various functions. These include: GPS, modem, camera, antennae, video transmitter, altimeter such as LIDAR, thermometer, hygrometer, and an air flow meter. In addition, the UAV can be provided with virtual reality (VR) technology through the camera or as a replacement for the camera, and the operator can be provided with a VR headset that is in communication with the UAV. This may be used to give the operator a better feel of the environment that is being sampled/flown through.

The filter-based air sampling device 22 can provide a number of advantages. It should be understood, however, that these advantages need not be required unless they are set forth in the appended claims. These include simplicity in design, such as being able to eliminate the need for a hose between the fan and the filter assembly. The air sampling device 22 is sturdy, sufficiently small in size, light weight, and has a low power draw so that it is suitable for being used on a small unmanned aerial vehicle (UAV). The use of a centrifugal fan in the air sampling device also provides the advantage that it can be mounted closely on the central housing portion of the airframe of an UAV without the central housing portion blocking or interfering with the flow of air into either the air inlet or the air outlet as may be the case with an axial fan. This advantage is possible because air exits the centrifugal fan at a right angle relative to the direction that air enters the centrifugal fan.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A filter-based air sampler comprising:
a centrifugal fan comprising a housing having an air inlet defining an annular opening and an air outlet; and
a filter assembly comprising:
   a filter support comprising a supporting grid and a perimeter portion surrounding the supporting grid, wherein the perimeter portion of the filter support has an inner surface and an outer surface and the supporting grid of the filter support has at least one opening therein, wherein said at least one opening in said supporting grid is in the configuration of an annular segment, and the annular segment is configured to at least partially align with the annular opening of the air inlet of the centrifugal fan, and the supporting grid comprises:
      i. a pair of members in the form of a cross; and
      ii. a pair of concentric rings that are joined to the members in the form of a cross,
      wherein the pair of members in the form of a cross are joined to the inner surface of the perimeter portion of the filter support;
   a filter; and
   an open faced air intake component having a central retaining member associated therewith, wherein said filter is positioned between the retaining member and the supporting grid of said filter support,
wherein said filter assembly is joined to the housing of said centrifugal fan with the supporting grid of said filter support being disposed over the air inlet of the centrifugal fan.

2. A filter-based air sampler comprising:
a centrifugal fan comprising a housing having an air inlet defining an annular opening and an air outlet and
a filter assembly comprising:
   a filter support comprising a supporting grid;
   a filter; and
   an open faced air intake component having a central retaining member associated therewith, wherein said filter is positioned between the retaining member and the supporting grid of said filter support, wherein the air intake component comprises:
      a tubular portion having an axis, a first end defining an air intake opening, a second end, an inside surface, and an outside surface; and
      a flange joined to the outside surface of the tubular portion adjacent the second end of the tubular portion and extending outwardly therefrom substantially perpendicularly to the axis of the tubular portion, wherein
      said retaining member is associated with the inside surface of the tubular portion, and said retaining member comprises a perimeter portion having an inner surface and an outer surface and at least one element joined to the inner surface of the perimeter portion that defines a grid with an annular opening therein, wherein the at least one element of the retaining member comprises:
         i. a pair of members in the form of a cross; and
         ii. a pair of concentric rings that are joined to the members in the form of a cross,
         wherein the pair of members in the form of a cross are joined to the inner surface of the perimeter portion of the retaining member,
wherein said filter assembly is joined to the housing of said centrifugal fan with the supporting grid of said filter support being disposed over the air inlet of the centrifugal fan.

3. The filter-based air sampler of claim 2 wherein the retaining member is associated with the inside surface of the tubular portion adjacent the second end of the tubular portion, and the first end of the tubular portion of the air intake component extends outward in a direction opposite the fan.

4. A filter-based air sampler comprising:
a centrifugal fan comprising a housing having an air inlet defining an annular opening and an air outlet, wherein the fan has a drive shaft and an impeller having blades that are mounted around a hub which is configured for revolving around said drive shaft and
a filter assembly comprising:
   a filter support comprising a supporting grid;
   a filter; and an open faced air intake component having a central retaining member associated therewith, wherein said filter is positioned between the retaining member and the supporting grid of said filter support, wherein the air intake component comprises:
   a tubular portion having an axis, a first end defining an air intake opening, a second end, an inside surface, and an outside surface, wherein the axis of the tubular portion of said air intake component is substantially aligned with the drive shaft of said fan; and
   a flange joined to the outside surface of the tubular portion adjacent the second end of the tubular portion and extending outwardly therefrom substantially perpendicularly to the axis of the tubular portion, wherein
   said retaining member is associated with the inside surface of the tubular portion, and said retaining member comprises a perimeter portion having an inner surface and an outer surface and at least one element joined to the inner surface of the perimeter portion that defines a grid with an annular opening therein,
wherein said filter assembly is joined to the housing of said centrifugal fan with the supporting grid of said filter support being disposed over the air inlet of the centrifugal fan.

5. The filter-based air sampler of claim 4 wherein said filter assembly is in direct contact with the portion of the housing having the air inlet of the centrifugal fan therein.

6. The filter-based air sampler of claim 5 wherein the filter assembly is joined to the centrifugal fan housing at a connection, and the connection between said filter assembly and said centrifugal fan is substantially air tight.

7. A filter-based air sampler comprising:
a centrifugal fan comprising a housing having an air inlet defining an annular opening and an air outlet and
a filter assembly comprising:
   a filter support comprising a supporting grid;
   a filter; and
   an open faced air intake component having a central retaining member associated therewith, wherein said filter is positioned between the retaining member and the supporting grid of said filter support, wherein the air intake component comprises:
      a tubular portion having an axis, a first end defining an air intake opening, a second end, an inside surface, and an outside surface, wherein the tubular portion of the air intake component is free of any obstructions inside the tubular portion from the air intake opening to the filter with the exception of the retaining grid to allow the free flow of air and particles from the air intake opening to the filter; and
      a flange joined to the outside surface of the tubular portion adjacent the second end of the tubular portion and extending outwardly therefrom substantially perpendicularly to the axis of the tubular portion, wherein
      said retaining member is associated with the inside surface of the tubular portion, and said retaining member comprises a perimeter portion having an inner surface and an outer surface and at least one element joined to the inner surface of the perimeter portion that defines a grid with an annular opening therein,
wherein said filter assembly is joined to the housing of said centrifugal fan with the supporting grid of said filter support being disposed over the air inlet of the centrifugal fan.

8. A filter-based air sampler comprising:
a centrifugal fan comprising a housing having an air inlet defining an annular opening and an air outlet, wherein the centrifugal fan has two extensions that extend outward from the outside of its housing that provide openings for bolts to pass through; and
a filter assembly comprising:
   a filter support comprising a supporting grid, wherein the filter support has side edges and two extensions along the side edges that provide openings for bolts to pass through;
   a filter; and
   an open faced air intake component having a central retaining member associated therewith, wherein said filter is positioned between the retaining member and the supporting grid of said filter support, wherein the air intake component comprises:
      a tubular portion having an axis, a first end defining an air intake opening, a second end, an inside surface, and an outside surface; and
      a flange joined to the outside surface of the tubular portion adjacent the second end of the tubular portion and extending outwardly therefrom substantially perpendicularly to the axis of the tubular portion, wherein the flange of the air intake component has side edges and two extensions along the side edges that provide openings for bolts to pass through, wherein
      said retaining member is associated with the inside surface of the tubular portion, and said retaining member comprises a perimeter portion having an inner surface and an outer surface and at least one element joined to the inner surface of the perimeter portion that defines a grid with an annular opening therein,
wherein said filter assembly is joined to the housing of said centrifugal fan with the supporting grid of said filter support being disposed over the air inlet of the centrifugal fan, wherein a pair of bolts that pass through the openings in the extensions of the fan housing, the openings in the extensions of the flange of the air intake component, and the openings in the extensions of the filter support, and hold the filter assembly and the centrifugal fan together.

9. An aerial sampling system comprising:
an unmanned aerial vehicle comprising an air frame comprising a central housing portion, a plurality of arms, said arms extending radially outwardly from the central housing portion, a plurality of rotors, wherein a rotor is mounted on each of the arms and each of said rotors is joined to and powered by a motor, wherein said motors are electrically connected to a power supply that is located on-board said air frame; and
a filter-based air sampler joined to the unmanned aerial vehicle, said filter-based air sampler comprising:
   a centrifugal fan comprising a housing having an air inlet and an air outlet, a drive shaft, and an impeller having blades that are mounted around a hub which is configured for revolving around said drive shaft, and a motor joined to said drive shaft for rotating said impeller, wherein said motor is electrically connected to a power supply; and a filter assembly comprising: a filter support comprising a supporting grid; a filter; and an open faced air intake component having a central retaining member associated therewith, wherein said filter is positioned between the retaining member and the supporting grid of said filter support, wherein said filter assembly is joined to the housing of said centrifugal fan with the supporting grid of said filter support being disposed over the air inlet of the centrifugal fan.

10. The aerial sampling system of claim 9 wherein the air sampler is joined to the top of the central housing portion of the unmanned aerial vehicle with the air intake opening of the air intake component facing away from said central housing portion of the unmanned aerial vehicle.

11. The aerial sampling system of claim 9 wherein the air sampler has overall dimensions such that the volume occupied by the air sampler is less than or equal to about 0.125 ft$^3$ (about 3,500 cm$^3$), weighs less than or equal to about 150 grams, and draws less than or equal to about 0.5 amps in power.

\* \* \* \* \*